United States Patent [19]
Ooba et al.

[11] Patent Number: 6,122,416
[45] Date of Patent: Sep. 19, 2000

[54] STACKED THERMO-OPTIC SWITCH, SWITCH MATRIX AND ADD-DROP MULTIPLEXER HAVING THE STACKED THERMO-OPTIC SWITCH

[75] Inventors: Naoki Ooba; Takashi Kurihara; Toshio Watanabe, all of Tokyo, Japan

[73] Assignee: Nippon Telegraph and Telephone Corporation, Tokyo, Japan

[21] Appl. No.: 09/160,757

[22] Filed: Sep. 25, 1998

[30] Foreign Application Priority Data

Sep. 26, 1997 [JP] Japan .................................. 9-262072

[51] Int. Cl.⁷ .............................. G02B 6/26; H04J 14/00
[52] U.S. Cl. .................................. 385/16; 385/15; 385/17; 385/24; 385/40; 385/41; 385/42; 385/14; 385/131; 385/132; 359/115; 359/124; 359/127; 359/128
[58] Field of Search ........................... 385/8, 9, 15, 16, 385/17, 24, 39, 40, 41, 42, 131, 132, 14; 359/115, 124, 127, 128

[56] References Cited

U.S. PATENT DOCUMENTS

| | | | |
|---|---|---|---|
| 4,648,686 | 3/1987 | Segawa | 385/17 X |
| 4,753,505 | 6/1988 | Mikami et al. | 385/16 X |
| 5,173,956 | 12/1992 | Hayes | 385/16 |
| 5,418,868 | 5/1995 | Cohen et al. | 385/16 |
| 5,513,285 | 4/1996 | Kawashima et al. | 385/16 |
| 5,699,462 | 12/1997 | Fouquet et al. | 385/18 |
| 5,712,932 | 1/1998 | Alexander et al. | 385/24 |
| 5,857,039 | 1/1999 | Bosc et al. | 385/14 |
| 5,904,491 | 5/1999 | Ojha et al. | 385/132 X |
| 5,978,527 | 11/1999 | Donald | 385/17 |

FOREIGN PATENT DOCUMENTS

| | | | |
|---|---|---|---|
| 0 21 90 69 | 4/1987 | European Pat. Off. | 385/3 X |
| 5-3 333 82 | 12/1993 | Japan | 385/42 X |
| 6-67 232 | 3/1994 | Japan | 385/42 X |
| 6-21 427 5 | 8/1994 | Japan | 385/42 X |

OTHER PUBLICATIONS

"Recent Research Trends and Issues in Photonic Switching Devices", Jun'ichi Yoshida, et al. (1995).

"Influence of Humidity on Transmission in a Y–Branch Thermo–Optic Switch Composed of Deuterated Fluoromethacrylate Polymer of Waveguides", Y. Hida, et al. Mar. 1997.

"A Novel Tape of 2×2 Digital Optical Switch Realized by Polymer Waveguide Technology", Norbert Keil, et al. Mar. 1995.

"Rearrangeable Nonblocking Polymer Waveguide Thermo–Optic 4×4 Switching Matrix with Low Power Consumption at 1.55 μm", N. Keil, et al.

"Low–Cost Edge–Illuminated Refracting–Facet Low Loss and High Extinction Ratio Silica–Based 16×16 Thermo–Optic Matrix Switch" (1998) IECE.

"8+16 Delivery and Coupling Switch Board for 320 GB/S Throughput Optical Path Cross–Connect System" 1996 IECE.

"26CH Add/Drop Multiplexer Using Silica–Based Arrayed–Waveguide Grating" (1995).

"Optical Intensity Modulation in a Vertically Stacked Coupler Incorporating Electro–Optic Polymer", Makoto Hikita, et al. Aug. 1993.

Primary Examiner—Brian Healy
Attorney, Agent, or Firm—Kenyon & Kenyon

[57] ABSTRACT

Cores of an optical waveguide forming a Y-branch structured thermo-optic switch are stacked in a direction perpendicular to a substrate, and a heater is disposed on a clad right above an area where the cores overlap, thereby utilizing a large temperature gradient by the heater in the direction perpendicular to the substrate. The resulting stacked thermo-optic switch is low in power consumption and signal loss and high in extinction ratio.

17 Claims, 9 Drawing Sheets

FIG.1A     FIG.1C

STACKED THERMO-OPTIC SWITCH, SWITCH MATRIX AND ADD-DROP MULTIPLEXER HAVING THE STACKED THERMO-OPTIC SWITCH

This application is based on Patent Application No. 262,072/1997 filed on Sep. 26, 1997 in Japan, pending, the content of which is incorporated hereinto by reference.

BACKGROUND OF THE INVENTION

1. Field of the Invention

The present invention relates to an optical path selection switch utilizing a thermo-optic effect which is, in a wavelength division multiplexing (WDM) network, a key device of an optical cross-connect system required for high-speed and low-cost communication trunk, or an optical add-drop multiplexer (ADM) which adds an optional-wavelength signal to a WDM optical signal or drops an optional-wavelength signal off from a WDM optical signal, more specifically to a stacked thermo-optic switch fabricated based on a design concept which is to arrange optical waveguides in a stacked configuration in order to achieve a low operation power, a high extinction ratio, and low-loss characteristics in these optical switches.

2. Description of the Prior Art

For optical cross-connects or optical ADMs which are essential for WDM systems, a high-performance optical switch is indispensable.

Among optical switches, those which make connection between physically separated optical paths are referred to as space division optical switch. As a space division optical switch, an optical path selection switch using a glass or polymer material having low optical propagation loss is promising. As the switching mechanism, a thermo-optic effect is often used (see, for example, NTT R&D, vol. 44, No. 7, p. 547–552).

Thermo-optic optical path selection switches include those which utilize adiabatic propagation, those which utilize an anisotropic directional coupler (DC), and those which are based on a Mach-Zehnder interferometer (MZI).

The adiabatic type is an optical path selection switch composed of Y-branching or X-branching optical waveguides in a plane parallel to the substrate, which is known as a digital switch because stable switching operation of saturated output can be achieved when adequate refractive index differences between branches are given (Y. Hida et al., "Electron Lett." vol. 33, 1997, p. 626, or N. Keil et al., "ECOC' 96" 2.71).

The DC type is composed of directional couplers in a plane parallel to the substrate, in which optical path is switched between two states of complete coupling symmetric DC and uncoupling asymmetric DC by a thermo-optic effect (N. Keil et al., "Electron Lett." vol. 31., 1995, p. 403).

The MZI type is provided with a specific phase difference of 0 or 180 degrees using a thermo-optic phase shifter to switch the optical path.

Although the digital switches and DC type switches are stable in operation and provide high extinction ratio, they have disadvantages of large power consumption.

As an integrated matrix switch, a 16×16 switch which uses MZI type thermo-optic switches using a silica glass optical waveguide (Goh et al., Proceedings of the 1998 IEICE General Conference C-3-129), a 4×4 switch which uses DC type thermo-optic switches (N. Keil et al., Electron. Lett. vol. 31, p. 403, 1995) and the like are known. The former has problems of large power consumption, large switch circuit, and complexity of a driver circuit which are disadvantages of MZI type silica thermo-optic switch. The latter is difficult to be developed to a low-loss large-scale switch because of large propagation loss which is a disadvantage of polymer optical waveguide. Further, a delivery-and-coupling type matrix switch formed by connecting a 1×8 MZI type silica thermo-optic switch and a splitter by optical fiber is being studied as a practical solution (Watanabe et al., Proceedings of 1996 Electronic Information Society B-1081), which, however, has no prospect for solving the problem of complexity of fiber wiring, in addition to the problem of the unit switch itself.

As an optical ADM device, there is an example in which WDM multiplexer/demultiplexers and MZI type thermo-optic switches are formed on a single substrate using silica glass optical waveguides (Okamoto et al., Proceedings of the 1995 IEICE General Conference C-254). This uses the same number of thermo-optic switches as multiplexed wavelengths, which has the above-described disadvantage of MZI type silica thermo-optic switch and a problem in chip fabrication yield associated with upscaling.

Further, from the view point of network system, in the optical cross-connect application, stability of switching operation and thorough reduction of coherent crosstalk are even further required. In addition, though it is still before a practical application stage, estimated packaging scale of optical cross-connect in the future will never be small, and it is expected that in the future, all types of optical waveguide switches including digital type, DC type, and MZI type will be required not only for basic switching performance but also for down-sizing and cost reduction. As to the optical ADM application, since optical ADM itself is in a hierarchy closer to the user than optical cross-connects, which means a larger market size, requirements are even stricter for cost reduction and down-sizing. However, performance of optical waveguide switches at present does not meet these system requirements.

As described above, since current optical path selection switches utilizing the thermo-optic effect including both digital and DC types use optical waveguide circuits spreading out in a plane parallel to the substrate, what drives the switch is a temperature gradient in a direction parallel to the substrate. Because a heater is required to be set at a position away from a core to give a temperature gradient in this direction from the heater lying on a clad, the switch has problems of inferior heating efficiency which results in an increased operation power. Further, there is also a problem that since a temperature gradient occurs in a direction perpendicular to the substrate which has no relation to the switching operation, it is difficult to prevent degradation of switching characteristics such as an increase in optical propagation loss.

Still further, optical cross-connect switches which are now being developed are mainly of a large-sized construction combining a plurality of discrete switches with couplers in a delivery-and-coupling configuration, and high-density wiring by optical fibers reaches its limit. Yet further, as to optical ADM devices, an attempt is being made for a single chip ADM utilizing advanced design and fabrication technologies, however, in the present situation where further down-sizing is difficult in view of design, yield of chip fabrication is an important problem. As described above, in the current optical path selection switches as a whole, there are no decisive solutions in connection with down-sizing and cost reduction.

It is therefore a first object of the present invention to provide a stacked thermo-optic switch which can most efficiently utilize a temperature gradient produced by heating with a heater, is low in power consumption and loss, and high in extinction ratio.

A second object of the present invention is to provide a method for down-sizing and cost reduction in a waveguide switch construction.

SUMMARY OF THE INVENTION

In the present invention, the first object is achieved by a construction in which optical waveguide cores forming a Y-branching or X-branching or directional coupler in a thermo-optic switch are stacked in a direction perpendicular to a substrate, compared to a disposition in a plane parallel to the substrate as in the prior art, and a heater is disposed right above the core to efficiently utilize a large temperature gradient in a direction perpendicular to the substrate. Furthermore, advantages of the prior art optical path selection switches are in principle completely maintained in the present invention.

Still further, it is found that the above stacked waveguide configuration is not only effective for low power consumption and high extinction ratio but also enables a compact device construction in which a plurality of device functions are shared by the upper and lower layers, thereby attaining the second object.

In accordance with a first aspect of the present invention, in a stacked thermo-optic switch comprising two cores stacked in a direction perpendicular to a substrate, the two cores have a contact part disposed in contact directly with each other, and a heater is disposed at an opposite side to the substrate through a clad layer having a predetermined thickness at a position overlapping at least in part in the vicinity of the contact part as viewed from a direction perpendicular to the substrate (the construction having an optical waveguide layout in which two cores in different layers directly contact in an area is defined as a contact arrangement). In this case, the two cores may have different effective refractive indices.

A second aspect of the present invention is characterized in that a clad layer having a predetermined thickness is inserted between two cores overlapping as viewed from a direction perpendicular to the substrate (hereinafter the construction is defined as a gap arrangement in contrast to the contact arrangement). Also in this case, the two cores may have different effective refractive indices.

The contact arrangement is considered to be appropriate for digital switches and the gap arrangement for DC type switches, however, digital switches of gap arrangement and DC type switches of contact arrangement are also operative in principle, and application is by no means rejected to limited requirements.

In the stacked thermo-optic switch of the present invention, it is important to form a difference in effective refractive index between the upper and lower cores. In general, when two cores are made of the same material, to provide an effective refractive index difference between both cores, it is necessary that the cores differ in their size (width or height) or an exclusive heater be actuated. By contrast, since, in the stacked waveguide layout of the present invention, the upper core and the lower core can be fabricated by independent processes, it is possible to fabricate the two cores from materials of different refractive indices. Therefore, there is an advantage that troublesome operations such as core diameter adjustment or actuation of an additional heater are not required.

Furthermore, in the present invention, the upper core and the lower core can be fabricated by independent processes, it is easily to fabricate the two cores from materials of different thermo-optic constant.

Compared with a case where the upper core and the lower core are made from the same material (e.g. material A), when A is used in the upper core, and the lower core is made from a material smaller in TO coefficient than A, or a material having a different sign of TO coefficient, extinction can be efficiently ensured, thereby obtaining sufficient characteristics with a small operation power.

However, if the material is high in thermal conductivity, heat is liable to dissipate into the substrate resulting in an increased operation power, especially the material of the lower core is required to be selected not only for an appropriate TO coefficient but also for small thermal conductivity. For example, when a contact arrangement stacked thermo-optic switch is fabricated using silica glass in the lower core and a polymer in the upper core, since thermal conductivity of silica glass is about ten times that of polymer, power consumption is expected to be greater than a case where both the upper and lower cores are fabricated from polymer. Therefore, it is considered that a low power consumption becomes possible for the first time when a material having a thermal conductivity of less than two times that of polymer and small in TO coefficient is used in the lower core. Embodiments 6 and 7 which will be described later describe only a gap arrangement DC type switch considering the above-described point in which the gap acts as a heat insulation layer and the upper core does not thermally contact silica glass layer.

As a practical example, a case is considered where silica glass is used in the lower core. The silica glass planar lightwave circuit is very small in propagation loss (up to 0.01 dB/cm) which is used in many examples of constructing low-loss large-scale optical integrated circuits. Therefore, in the stacked thermo-optic switch of the present invention, by using the silica glass in the lower layer and a polymer in the upper layer, it is possible to achieve a low-loss optical cross-connect circuit or an optical branching and insertion (optical ADM) circuit utilizing a high TO coefficient of polymers.

The above and other objects, effects, features, and advantages of the present invention will become more apparent from the following description of embodiments thereof taken in conjunction with the accompanying drawings.

BRIEF DESCRIPTION OF THE DRAWINGS

FIG. 1A is a top plane view showing the structure of an example of Y-branching type contact arrangement digital switch;

FIG. 1C is a cross-sectional view showing the structure of an example of Y-branching type contact arrangement digital switch;

FIG. 2B is a longitudinal section showing the structure of another example of Y-branching type contact arrangement digital switch;

DETAILED DESCRIPTION OF THE PREFERRED EMBODIMENTS

In the following, the present invention will be described in detail in connection with the embodiments, however, the present invention is not limited to these embodiments.

Embodiment 1

Figure 1B:
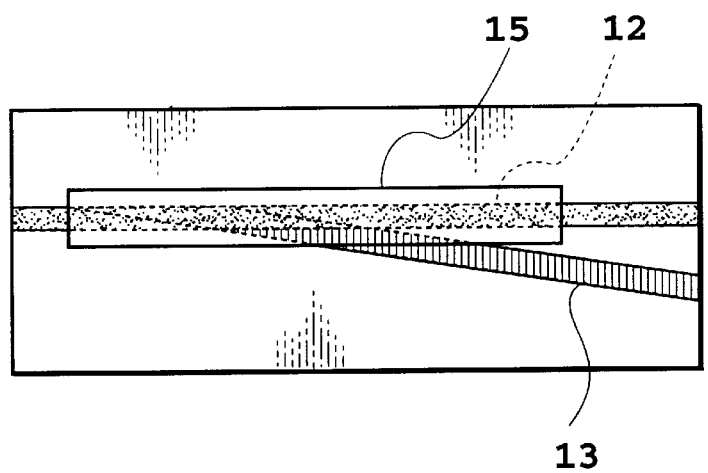
FIG. 1B is a longitudinal section showing the structure of an example of Y-branching type contact arrangement digital switch.
Figure 2A:
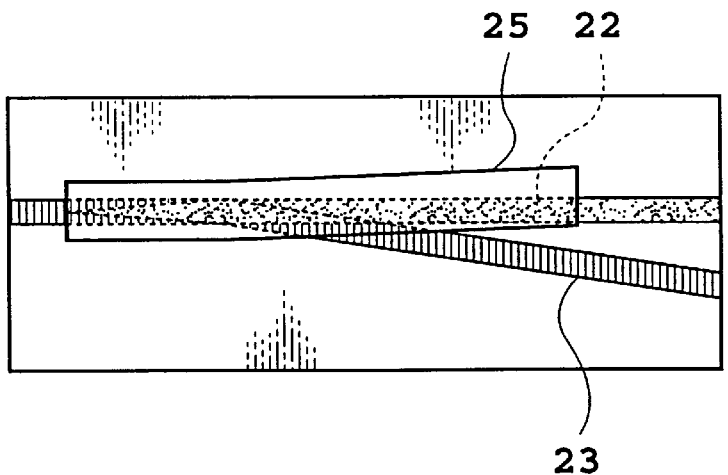
FIG. 2A is a top plane view showing the structure of another example of Y-branching type contact arrangement digital switch.
Figure 2C:
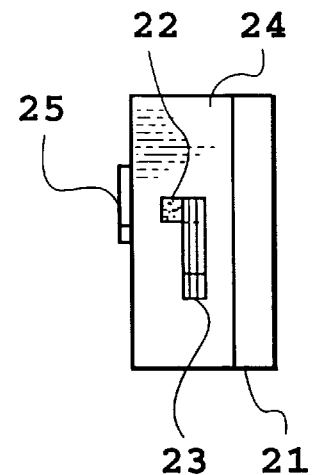
FIG. 2C is a cross-sectional view showing the structure of another example of Y-branching type contact arrangement digital switch.

FIGS. 1A, 1B, 1C and 2A, 2B, 2C illustrate one and another examples of a digital switch of a Y-branching contact arrangement, in which FIG. 1A and FIG. 2A are plane diagrams, FIGS. 1B and 2B side diagrams, and FIGS. 1C and 2C front diagrams. In FIGS. 1A, 1B, 1C and 2A, 2B, 2C, numerals 11 and 21 indicate a substrate, 12 and 22 an upper core, 13 and 23 a lower core, 14 and 24 a clad, 15 and 25 a heater. Here, FIGS. 1A, 1B, 1C are types in which the upper core 12 is an input, and FIGS. 2A, 2B, 2C are types in which the lower core 23 is an input.

As the heaters 15 and 25, a metal thin film heater is generally used. FIGS. 1A, 1B, 1C and 2A, 2B, 2C show only a heater, and a lead for flowing a current is omitted. Further, in FIGS. 2A, 2B, 2C, the position of the heater 25 is offset to the front distant from the lower core 23 compared to right above the upper core 22 so that a temperature difference between the two cores is a maximum, thereby reducing the operation power.

When a thermo-optic (TO) coefficient is negative as in a polymer material, it is needed to select the core materials so that the refractive index of the upper core at the side closer to the heater is higher than the refractive index of the lower core at the side closer to the substrate.

Structure and function of each area of the switch are summarized as shown below.

A: An area of ordinary single optical waveguide. There is no substantial difference in operation between the upper core as in FIGS. 1A, 1B, 1C and the lower core as in FIGS. 2A, 2B, 2C, and can be selected according to the design of the entire optical circuit including the switch.

B: An area where total cross-sectional areas of the two cores gradually change. It is an essential condition that the cross-sectional areas be gradually changed to an extent that a mode conversion does not occur (adiabatic condition), and a difference in configuration as in FIGS. 1A, 1B, 1C and 2A, 2B, 2C does not substantially affect the characteristic.

C: An area where the two cores have a mode coupling, and the centers thereof are separating while satisfying the adiabatic condition.

D: An area of optical waveguide having two independent cores with no coupling.

In FIGS. 1A, 1B, 1C and 2A, 2B, 2C, the upper core is represented to be a straight line, however, if at least the above adiabatic condition is satisfied, a curved part or a bend part may be present in the upper core or the lower core.

Electrical field of fundamental mode at the boundary of areas C and D is concentrated in the core of higher effective refractive index. As a result, fundamental mode light incident from area A, when the adiabatic condition is met in area B and area C, is selectively conducted to the core of the side with higher effective refractive index. Therefore, incident light, when the heater is not operated, is outputted to the upper core which is designed for a higher effective refractive index, and, when the heater is operated and the effective refractive index of the upper core is decreased due to an thermo-optic effect, is conducted to the lower core.

Figure 1B:
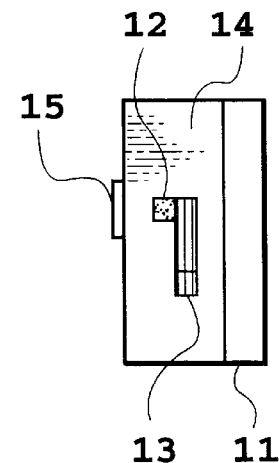
Figure 1B:
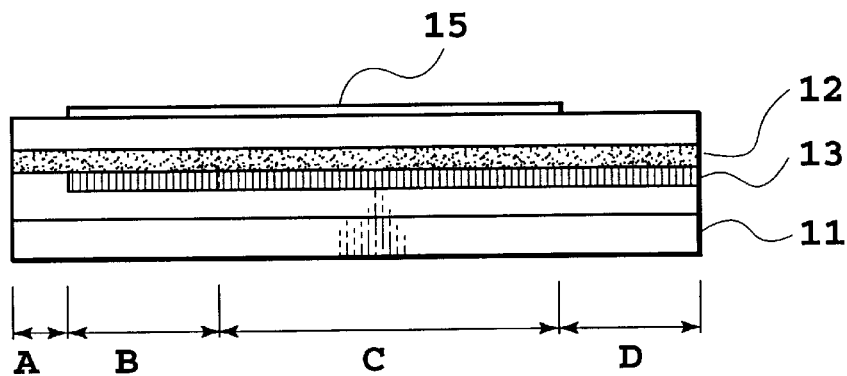
Figure 6:
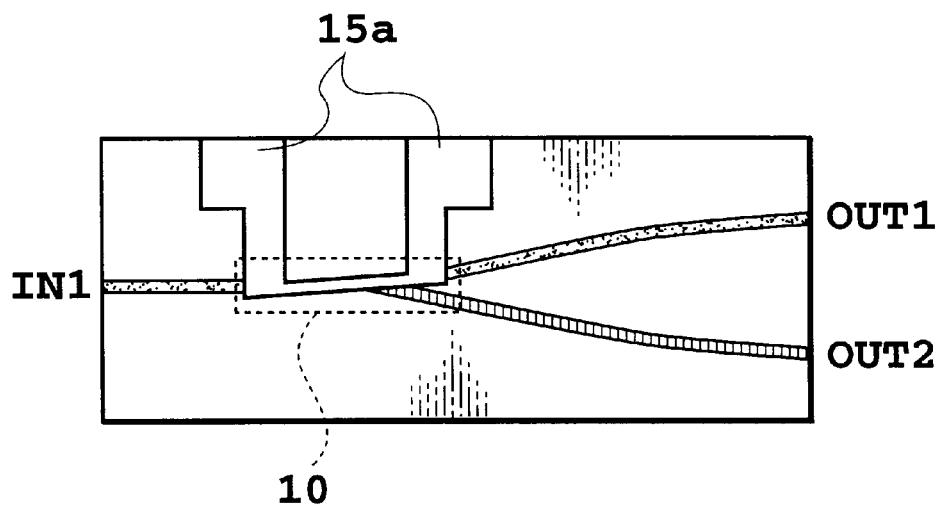
FIG. 6 is a diagram showing an embodiment of Y-branching type contact arrangement digital switch.

FIG. 6 shows an embodiment of Y-branching type contact arrangement digital switch including a switch shown in FIG. 1 as par indicated by numeral 10 in which the upper core is used as input. Sizes of respective parts are such that both upper and lower cores have a cross section of 8 $\mu$m×8 $\mu$m, a clad thickness between the lower core and the substrate is 20 $\mu$m, a clad thickness on the upper core is 14 $\mu$m, an angle between the upper core and the lower core projected in a plane horizontal to the substrate (hereinafter simply referred to as branching angle) is 0.2 degree, and a heater length is 7 mm. Numeral 15a is a terminal of a heater 15.

As materials, deuterated polymethylmethacrylate (hereinafter referred to as d8-PMMA) was used in the upper core, d8-PMMA with increased partial fluorination degree to decrease refractive index to a value lower than the upper layer in the lower core, and an epoxy type ultraviolet curable resin (hereinafter referred to as UV resin) in the clad. Refractive indices (at wavelength 1.55 $\mu$m) of the upper and lower core and the clad were 1.4800, 1.4794, and 1.4753, respectively.

The UV resin was spin coated on the silicon substrate, cured by irradiating with ultraviolet rays to form a lower clad with a thickness of 20 $\mu$m. On top of which a lower core d8-PMMA layer was formed. On which a resist was coated, pattern exposed, and developed. Further, using the resist pattern as a mask, reactive ion etching of oxygen gas was performed to process the d8-PMMA layer into a 8 $\mu$m×8.5 $\mu$m rectangular form, and the resist pattern was peeled.

Next, the UV resin was spin coated on the ridge type optical waveguide, and UV cured to obtain a 9.5 $\mu$m thick flat UV resin film. Then, without using a mask, the entire surface was etched by a thickness of 1.5 $\mu$m by reactive ion etching. This formed a d8-PMMA lower core having a cross section of 8 $\mu$m×8 $\mu$m flush in upper surface with peripheral UV resin clad.

Further on top of which d8-PMMA for the upper core of 8 $\mu$m in thickness was stacked, after resist coating, pattern exposed using a finely positioned upper core mask, developed, and reactive ion etched to form the upper core of 8 μm in width. After peeling the resist pattern, using the same procedure as above, a flat UV resin clad layer (22 μm in thickness, on-core thickness being 14 μm) was formed.

A metal thin film was deposited on the above flat UV resin clad by a sputtering apparatus, and a heater was formed using a photolithographic method and a dry etching method.

Single mode fibers were butt coupled to the input and two outputs of the optical waveguide, and 1.55 μm wavelength laser light was applied from the input side fiber. When no electric power was applied to the heater on the upper core, the light outputted from the upper core with an insertion loss of 2.8 dB. When the heater was energized to drive, at a power of 50 mW, all optical signals were outputted through the lower core. At this moment, optical loss was 3 dB, and extinction ratio was 40 dB, thus achieving a stacked thermo-optic switch having practically sufficient characteristics.

Embodiment 2

Using thermosetting silicones with different refractive indices in the upper and lower cores and the clad, a Y-branching type contact arrangement digital switch similar to embodiment 1 was fabricated. Sizes and angle of the respective parts were same as those in embodiment 1. Refractive index data at wavelength 1.55 μm are shown in Table 1.

TABLE 1

| | |
|---|---|
| Thermosetting silicone (upper core) | 1.4938 |
| Thermosetting silicone (lower core) | 1.4932 |
| Thermosetting silicone (clad) | 1.4890 |

Thermosetting silicone for clad dissolved in a solvent was spin coated on the silicon substrate, and cured by heating at 250° C. for 1 hour to form a lower clad of 20 μm in thickness. Similarly on which a 8.5 μm thick lower core silicone layer was formed. On top of which a resist was coated, pattern exposed, and developed. Further, using the resist pattern as a mask, reactive ion etching of carbon tetrafluoride was carried out to process the lower core into a 8 μm×8.5 μm rectangular form, and then the resist pattern was peeled.

Next, silicone for clad was spin coated on the ridge type optical waveguide, which was heat cured to obtain a 9.5 μm thick flat lower clad film. Then, without using a mask, the entire surface was etched by a thickness of 1.5 μm by reactive ion etching. This formed a lower core having a cross section of 8 μm×8 μm flush in upper surface with peripheral lower clad.

Further on top of which a silicone film for the upper core of 8 μm in thickness was stacked, after resist coating, pattern exposed using a finely positioned upper core mask, developed, and reactive ion etched to form the upper core of 8 μm in width. After peeling the resist pattern, using the same procedure as above, a flat UV resin clad layer (22 μm in thickness, on-core thickness being 14 μm) was formed.

A metal thin film was deposited on the above flat clad by a sputtering apparatus, and a heater was formed using a photolithographic method and a dry etching method.

As a switch structure, in addition to the upper core input type (type A) described in embodiment 1, a switch of lower core input type (type B) was also fabricated.

Measured results of the relationship between insertion loss and heating power between respective ports of the thus fabricated devices are shown in Table 2. The measurement wavelength is 1.55 μm.

TABLE 2

| Type | Heater power | 0 mW | 40 mW | 80 mW |
|---|---|---|---|---|
| A | In 1 - Out 1 | 1.8 dB | 40 dB | 47 dB |
|   | In 1 - Out 2 | 42 dB | 2.1 dB | 2.0 dB |
| B | In 1 - Out 1 | 2.1 dB | 42 dB | 48 dB |
|   | In 1 - Out 2 | 40 dB | 1.8 dB | 1.7 dB |

For both type A and type B, at any heating power of 40 to 80 mW, on-port (Out 2) insertion loss and extinction ratio were less than 2.2 dB and more than 37 dB, respectively. It has been found that in this heating power range, heating power-independent, so-called digital switching characteristics can be guaranteed.

Embodiment 3

Figure 3B:
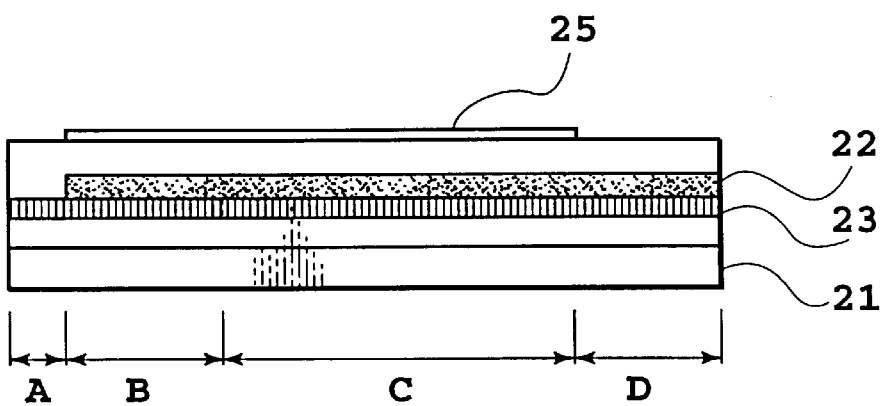
FIG. 3B is a longitudinal section showing the structure of an example of X-branching type contact arrangement digital switch.
Figure 3A:
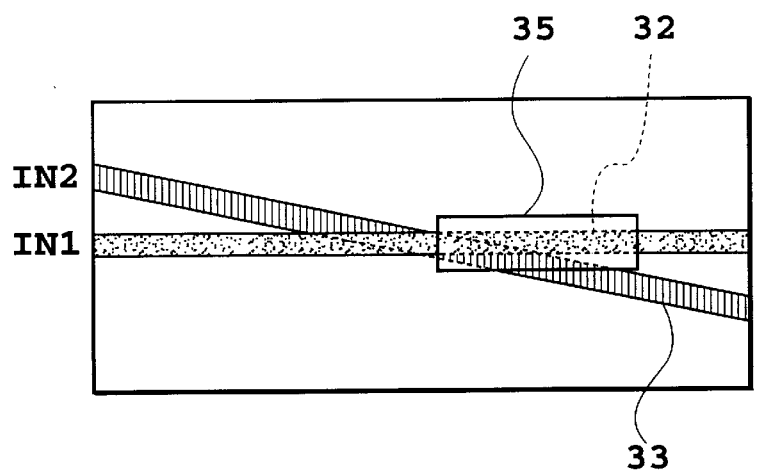
FIG. 3A is a top plane view showing the structure of an example of X-branching type contact arrangement digital switch.
Figure 3C:
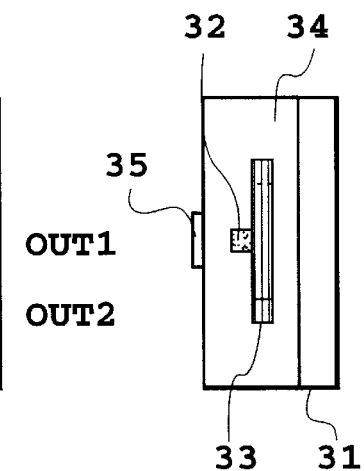
FIG. 3C is a cross-sectional view showing the structure of an example of X-branching type contact arrangement digital switch.
Figure 3B:
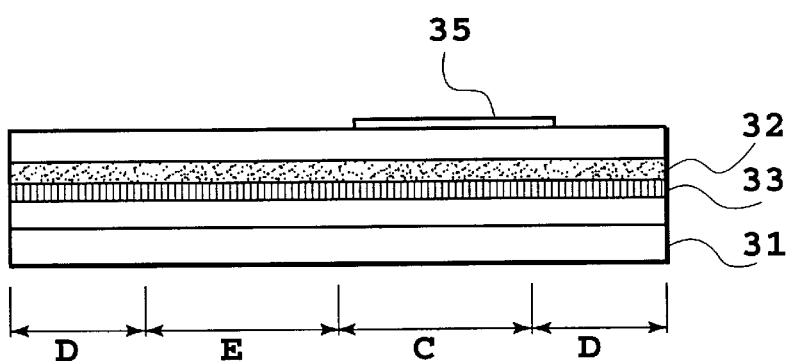

FIGS. 3A, 3B and 3C show an example of digital switch of a X-branching type contact arrangement, in which FIG. 3A is a plane diagram, FIG. 3B is a side diagram, and FIG. 3C is a front diagram. In the Figure, reference numeral 31 indicates a substrate, 32 is an upper core, 33 is a lower core, 34 is a clad, and 35 is a heater. Structure other than the branch configuration is the same as the Y-branching type. Further, the structure and functions of areas C and D are the same as the above Y-branching type, and the structure and function of area E are the same as area C except for the presence of a heater.

At C-D boundary and E-D boundary, electrical field of fundamental mode is concentrated in the core of higher effective refractive index, and electrical field of secondary mode is concentrated in the core of lower effective refractive index. As a result, when the adiabatic condition is met in areas C and E, light incident from the core of the higher effective refractive index side at the input side is conducted to the core of the higher effective refractive index side of the output side, and, light incident from the core of the lower effective refractive index side is conducted to the core of the lower effective refractive index side.

When not heating, light incident to In 1 and In 2 is outputted respectively to Out 1 and Out 2, to become a bar state. When a heater 35 is operated and higher and lower relation in effective refractive index of the upper core and lower core is reversed only in area C, light incident to In 1 and In 2 are outputted respectively to Out 2 and Out 1, to become a cross state, and functions as a 2×2 switch.

As described above, a digital thermo-optic switch operating by a temperature gradient in the direction perpendicular to the substrate is for the first time accomplished by the stacked thermo-optic switch according to the present invention.

Figure 4A:
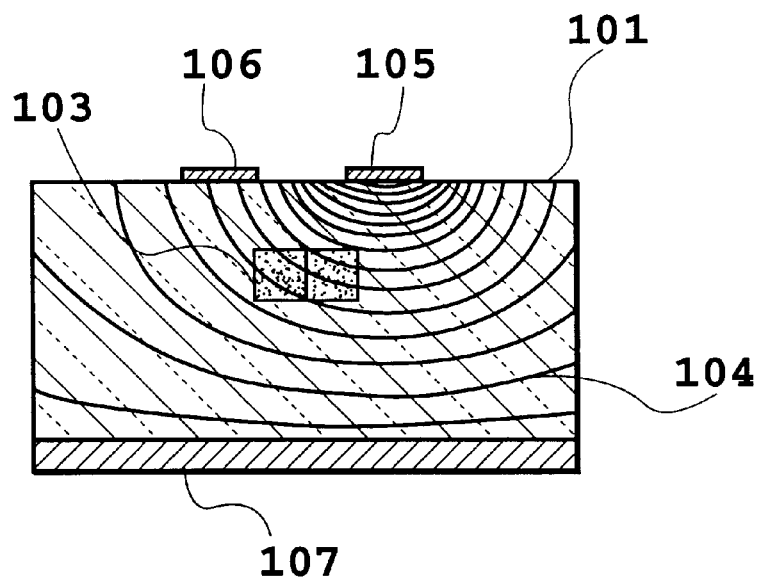
FIG. 4A is a longitudinal section of a planer type digital thermo-optic switch with an isothermal line by heater.
Figure 4B:
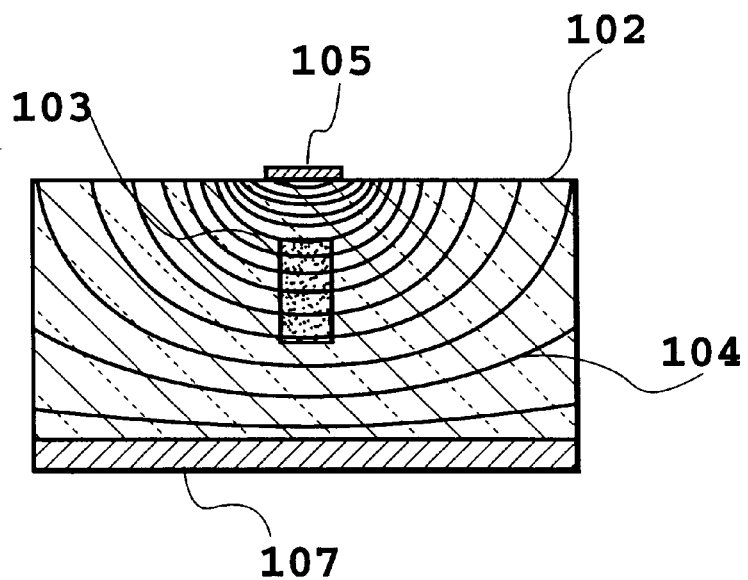
FIG. 4B is a longitudinal section of a stacked digital thermo-optic switch with an isothermal line by heater.

Since the prior art thermo-optic switch uses an optical waveguide circuit spreading in a plane parallel to the substrate, what drives the switch is a temperature gradient in a direction parallel to the substrate. In order to provide a temperature gradient in this direction, the heater is required to be disposed at a position distant from the core. Temperature gradient in the branching cross section in this case is shown in FIG. 4A. In FIGS. 4A and 4B, numeral 101 indicates a planar type thermo-optic switch, 102 a stacked thermo-optic switch, 103 a sectional plane of a core at branching, 104 an isothermal line per 10 C, 105 a sectional plane of a heater being heated, 106 a sectional plane of a heater being not heated, and 107 a substrate. Therefore, in case of FIG. 4A, there has been a problem in that heating efficiency is poor to obtain a temperature gradient in the branching direction, resulting in an increased operation power. Further, since a temperature gradient in a direction perpendicular to the substrate also generates at the same time which is not related to the switch operation there has also been a problem in that it is difficult to prevent degradation of switch characteristics such as an increase in propagation loss.

In contrast to the above, in the stacked thermo-optic switch of the present invention, as shown in FIG. 4B, the light branching direction is in line with the direction of temperature gradient, and, by utilizing the large temperature gradient right beneath the heater, it is possible to drive the switch at a low power which could not be achieved by the prior art. Furthermore, stable operation and high extinction ratio which are advantageous features of the digital type are maintained same as or better than those of the prior art.

Figure 7:
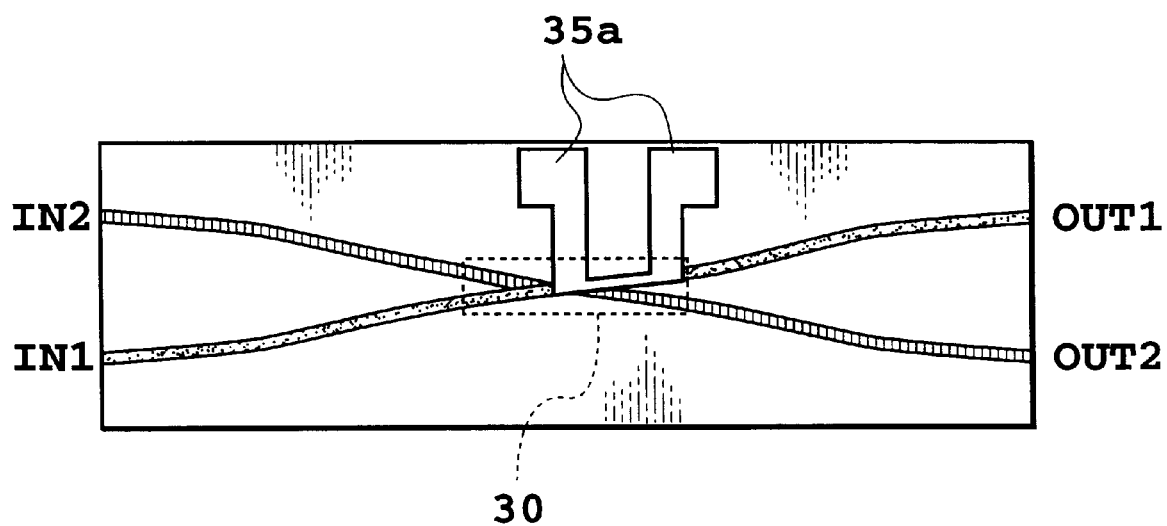
FIG. 7 is a diagram showing an embodiment of X-branching type contact arrangement digital switch.

FIG. 7 shows an embodiment of X-branching type contact arrangement digital switch including a switch shown in FIG. 1 as part indicated by numeral 30. Sizes of respective parts are such that both upper and lower cores have a cross section of 8 $\mu$m×8 $\mu$m, clad thickness between the lower core and the substrate is 20 $\mu$m, clad thickness on the upper core is 14 $\mu$m, branching angle is 0.2 degree, and heater length is 4 mm. Numeral 35a is a terminal of a heater 35.

Measured results of the relationship between insertion loss and heating power between respective ports of the fabricated device are shown in Table 3. The measurement wavelength is 1.55 $\mu$m.

TABLE 3

| | Heating power | 0 mW | 50 mW | 80 mW |
|---|---|---|---|---|
| Bar port | In 1 - Out 1 | 1.8 dB | 40 dB | 44 dB |
| | In 2 - Out 2 | 1.9 dB | 40 dB | 44 dB |
| Cross port | In 1 - Out 2 | 40 dB | 2.2 dB | 2.0 dB |
| | In 2 - Out 1 | 39 dB | 2.1 dB | 2.0 dB |

At any heating power of 50 to 90 mW, cross port insertion loss and extinction ratio were less than 2.2 dB and more than 37 dB, respectively. From the above, it has been demonstrated that this optical switch operates as a 2×2 switch which becomes bar state without heating, and cross state with heating of 50 to 80 mW.

Embodiment 4

Figure 5A:
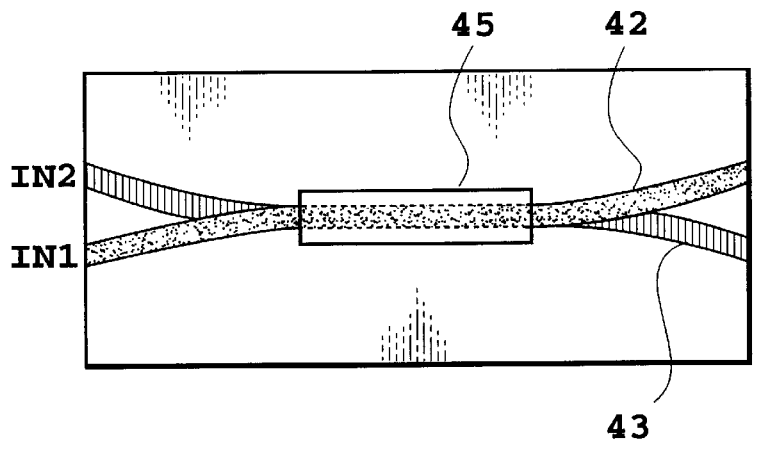
FIG. 5A is a top plane view showing the structure of an example of gap arrangement DC type switch.
Figure 5C:
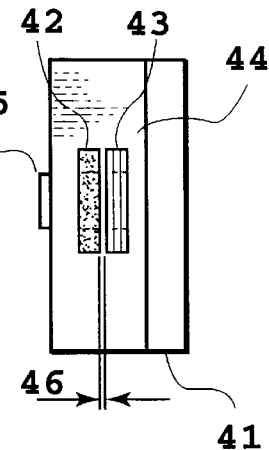
FIG. 5C is a cross-sectional view showing the structure of an example of gap arrangement DC type switch.
Figure 5B:
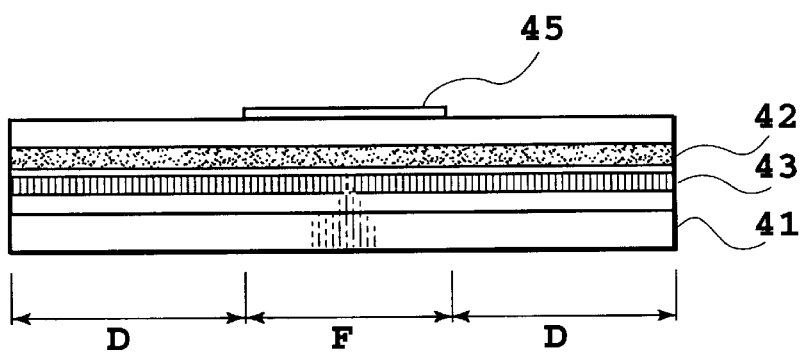
FIG. 5B is a longitudinal section showing the structure of an example of gap arrangement DC type switch.

FIGS. 5A, 5B and 5C shows an example of gap arrangement DC type switch, in which 5A is a plane diagram, FIG. 5B is a side diagram, and FIG. 5C is a front diagram. In the Figure, numeral 41 indicates a substrate, 42 is an upper core, 43 is a lower core, 44 is a clad, 45 is a heater, and 46 is a gap.

Structure and function of each part of the switch are summarized in the following.

D: an area of optical waveguide having independent two cores with no coupling.

F: a coupling area of directional coupler (DC).

The Figure shows a configuration in which the upper core 42 and the lower core 43 cross with each other, however, alternatively, it is also possible to change the bending direction in the area D so that In 1 and Out 1 come to the same side.

The operation principle differs between a case when the upper core and the lower core are the same in propagation constant (type 1) and a case when differing (type 2).

In type 1, length of the area F is set to a complete coupling length, and when not being heated, a cross state is established, that is, a combination of In 1-Out 2 and In 2-Out 2 is transmission state. When the heater 45 is operated, the area F becomes asymmetric DC due to a TO effect. By setting an appropriate heating power, a bar state is achieved, and the switch operates as a 2×2 switch.

In type 2, the heater 45 is operated to set a heating power at which the upper core 42 and the lower core 43 are equal in propagation constant. Length of the area F is set to a complete coupling length of this state, and the cross state is established when the heater 45 is operated. A refractive index difference between upper core material and lower core material is previously set so that the area is asymmetric DC and a bar state is achieved when not being heated.

As described above, the DC type thermo-optic switch, which operates by a temperature gradient in a direction perpendicular to the substrate, can also be achieved for the first time by the stacked thermo-optic switch according to the present invention. As in the above-described digital switch, a reduction in power consumption is successfully achieved also in the DC type.

Figure 8:
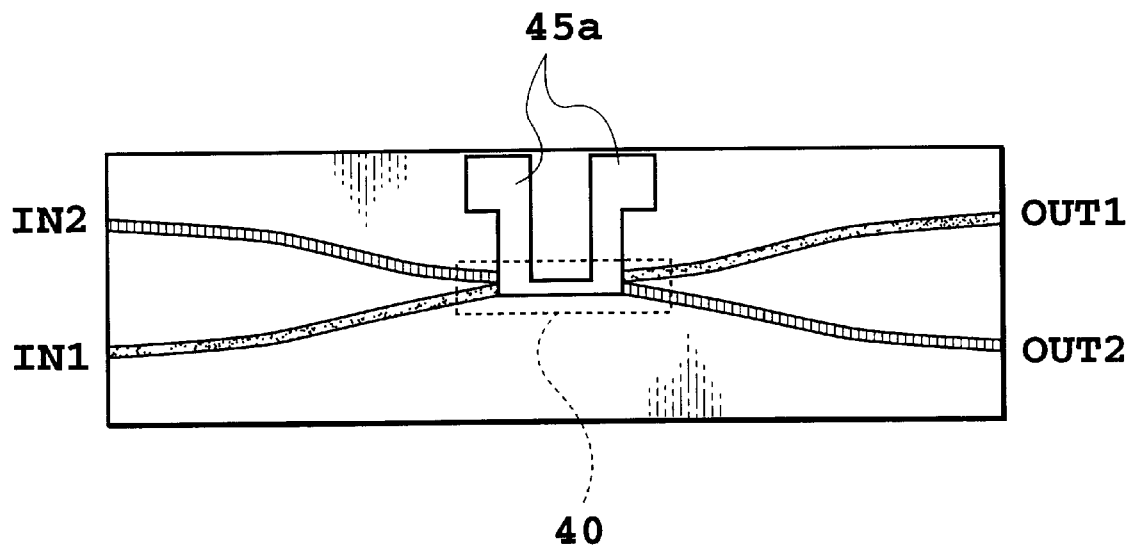
FIG. 8 is a diagram showing an embodiment of gap arrangement directional coupler type switch.

FIG. 8 shows an embodiment of gap arrangement DC type switch including a switch shown in FIG. 5 as part indicated by numeral 40. Sizes of respective parts were such that a core cross section was 8 $\mu$m×8 $\mu$m, a clad thickness between the lower core and the substrate was 20 $\mu$m, a clad thickness on the upper core was 14 $\mu$m, a length of coupling part where the upper and lower cores are overlapped was 1.7 mm which is a complete coupling length, and a heater length was 2 mm. Further, a bending radius in the area D shown in FIG. 5 was 30 mm. Materials used and refractive indices thereof at wavelength 1.55 $\mu$m are shown in Table 4. The fabrication process is as in embodiment 2. However, to form the gap between the upper and lower cores, the lower core had a thickness of 8 $\mu$m, the lower clad had a thickness of 11 $\mu$m, and the entire surface etching after lower clad formation is not performed.

TABLE 4

| Thermosetting silicone (core) | 1.4935 |
|---|---|
| Thermosetting silicone (clad) | 1.4890 |

Measured results of the relationship between insertion loss and heating power between respective ports of the fabricated device are shown in Table 5. The measurement wavelength is 1.55 $\mu$m.

TABLE 5

| | Heating power | 0 mW | 32 mW |
|---|---|---|---|
| Bar port | In 1 - Out 1 | 34 dB | 2.0 dB |
| | In 2 - Out 2 | 33 dB | 2.0 dB |
| Cross port | In 1 - Out 2 | 1.8 dB | 34 dB |
| | In 2 - Out 1 | 1.9 dB | 35 dB |

From the above results, it has been demonstrated that this optical switch operates as a 2×2 switch which becomes cross state at a heating power of 0 mW, and bar state at a heating power of 32 mW.

Embodiment 5

Using the same procedure as in embodiment 4, a commercial optical polymer material, that is ARTON (from Japan Synthetic Rubber Co.) or ZEONEX (from Nippon Zeon Co.) was used as a core material to fabricate gap arrangement DC type switches. As clad materials, UV resins with a refractive index difference of 0.3±0.05% in 1.55 $\mu$m band were used for respective core materials.

A heating power of more than 70 mW was required to obtain an extinction ratio of more than 40 dB with the above fabricated two gap arrangement DC type switches.

Embodiment 6

In the gap arrangement DC type switch of the structure as shown in FIG. 8, a switch using inorganic glass-made core and clad in the lower layers was fabricated. Materials used are summarized in Table 6.

TABLE 6

| UV resin (for upper core) | 1.4590 |
| Ge-doped silica glass (for lower core) | 1.4576 |
| UV resin (for upper clad, intermediate clad) | 1.4532 |
| Ge-doped silica glass (for lower clad) | 1.4530 |

Figure 9:
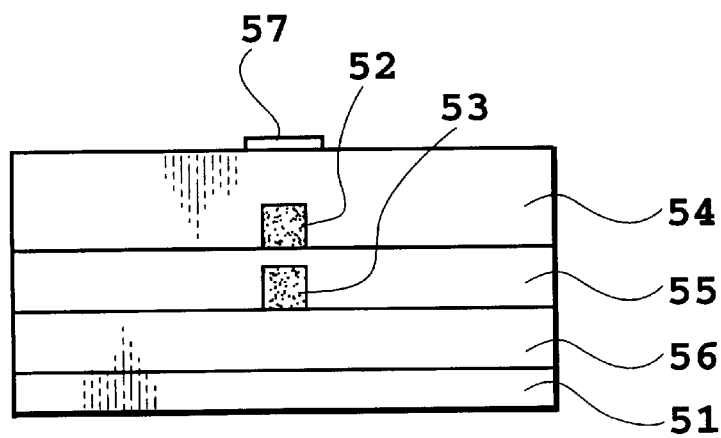
FIG. 9 is a sectional diagram showing another embodiment of gap arrangement directional coupler type switch.

The lower clad and the lower core made from Ge-doped silica glass were fabricated by a flame hydrolysis deposition method. Processes after the intermediate clad fabrication are the same as in embodiments 1 and 4. Optical waveguide structure is shown in FIG. 9. In FIG. 9, 51 is a substrate, 52 is a polymer upper core, 53 is a lower core, 54 is a polymer upper clad, 55 is a polymer intermediate clad, 56 is a silica glass lower clad, and 57 is a heater. Sizes of the respective parts were the same as in embodiment 4.

Measured results of the relationship between insertion loss and heating power between respective ports of the fabricated device are shown in Table 7. The measurement wavelength is 1.55 μm.

TABLE 7

|  |  | Heating power | 0 mW | 3 mW | 24 mW |
|---|---|---|---|---|---|
| Bar port | In 1 - Out 1 |  | 2.8 dB | 2.6 dB | 30 dB |
|  | In 2 - Out 2 |  | 2.0 dB | 1.4 dB | 32 dB |
| Cross port | In 1 - Out 2 |  | 25 dB | 28 dB | 1.8 dB |
|  | In 2 - Out 1 |  | 24 dB | 27 dB | 1.9 dB |

From the above results, it has been demonstrated that this optical switch operates as a 2×2 switch which becomes bar state at a heating power of 3 mW, and cross state at a heating power of 24 mW.

The Ge-doped silica glass optical waveguide, in the present embodiment, as described above, was one which fabricated by the flame hydrolysis deposition method, however, it has been confirmed that a substantial change is not generated in the switching characteristic when using a Ge-doped silica glass optical waveguide fabricated by a chemical vapor deposition method and an improved method thereof.

Embodiment 7

Figure 10A:
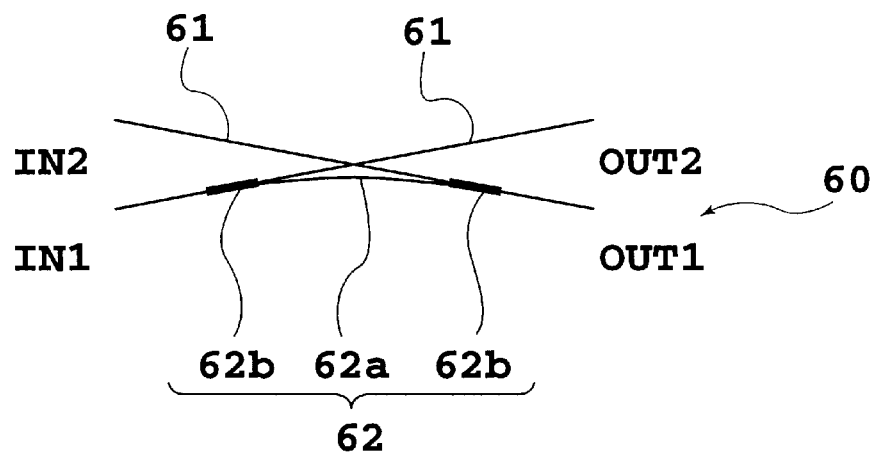
FIG. 10A is a diagram showing a unit switch integrating gap arrangement directional coupler type switches.
Figure 10B:
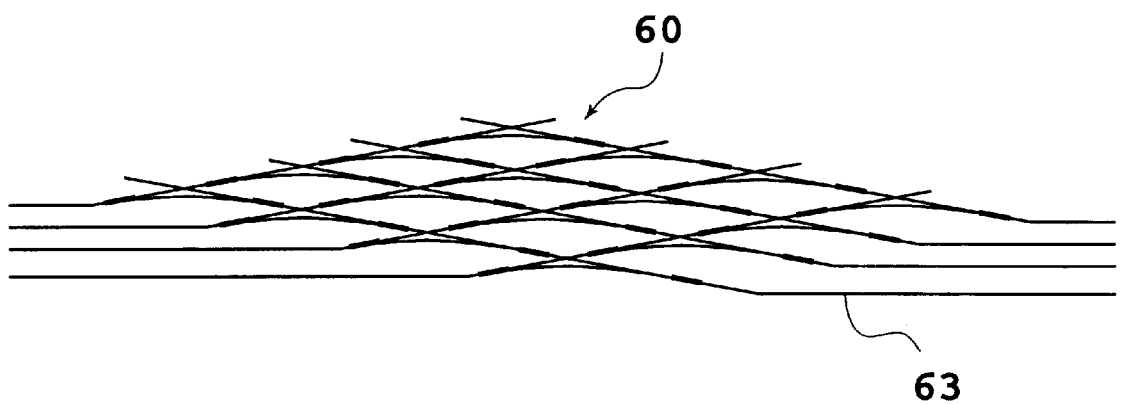
FIG. 10B is diagram of a 4×4 switch matrix having the unit switches shown in FIG. 10A.

As shown in FIGS. 10A and 10B, a matrix switch is devised in which the lower layer comprises low propagation loss silica glass-based waveguides 61 and 63, and the upper layer comprises polymer waveguides 62 having coupling parts 62b with the lower waveguides at both ends. The coupling part forms the stacked thermo-optic switch. Any type of the stacked thermo-optic switch described above including the digital Y-branching type and the DC type can be used in this matrix switch. A unit switch, shown as numerical 60 in FIGS. 10A and 10B, functions as a 2×2 switch. 4×4 non-blocking connection is achieved by driving appropriate four unit switches in the matrix switch. Even when matrix scale is expanded as 8×8, since only the length of the low-loss lower layer optical waveguides is increased, and a signal light passes in the polymer optical waveguide only once for each connection channel, it is possible to suppress increase of loss.

A 4×4 matrix switch was fabricated using a gap arrangement DC type switches as the coupling part as shown in FIGS. 10A and 10B. Sizes, materials and fabrication process of the upper core, lower core and clad are the same as in embodiment 6.

FIG. 10A shows a unit switch, in which numeral 61 indicates a silica glass-based lower core, forming a straight crossing optical waveguide with a cross angle of 20 degrees. 62 is a UV resin-based upper core comprising a curved part 62a of 30 mm in radius and about 10 mm in length and a 1.7 mm long straight coupling part 62b. A heater (not shown) is disposed on the clad of the straight coupling part 62b. When not being heated, combinations of In 1-Out 2, In 2- Out 1 are in connection state. When the straight coupling parts 62b at both ends are simultaneously heated, light couples to the upper core, and In 1-Out 1 ecomes connection state.

16 Units of the unit switch 60 were coupled as shown in FIG. 10B to fabricate a 4×4 matrix switch. 63 is an input/output silica glass lower layer optical waveguide. By heating necessary four unit switches 60 to operate, a 4×4 non-blocking connection was achieved. Characteristics in matrix switch operation are shown in Table 8.

TABLE 8

| Heating power of non-operated unit switch | 8 mW |
| Heating power of operated unit switch | 48 mW |
| Total heating power at matrix operation | 260 mW |
| Insertion loss between connection ports | 2.0 dB |
| Insertion loss between non-connection ports | 26 dB |

Embodiment 8

Another matrix switch is devised in which the lower core comprises a plurality of inorganic glass-based waveguides not crossing with each other, the upper core is a single or plurality of polymer optical waveguides not always the same in numbers the lower core, and the stacked switch according the present invention is constructed where the lower core and the upper core cross as viewed in a direction perpendicular to the substrate.

Figure 11:
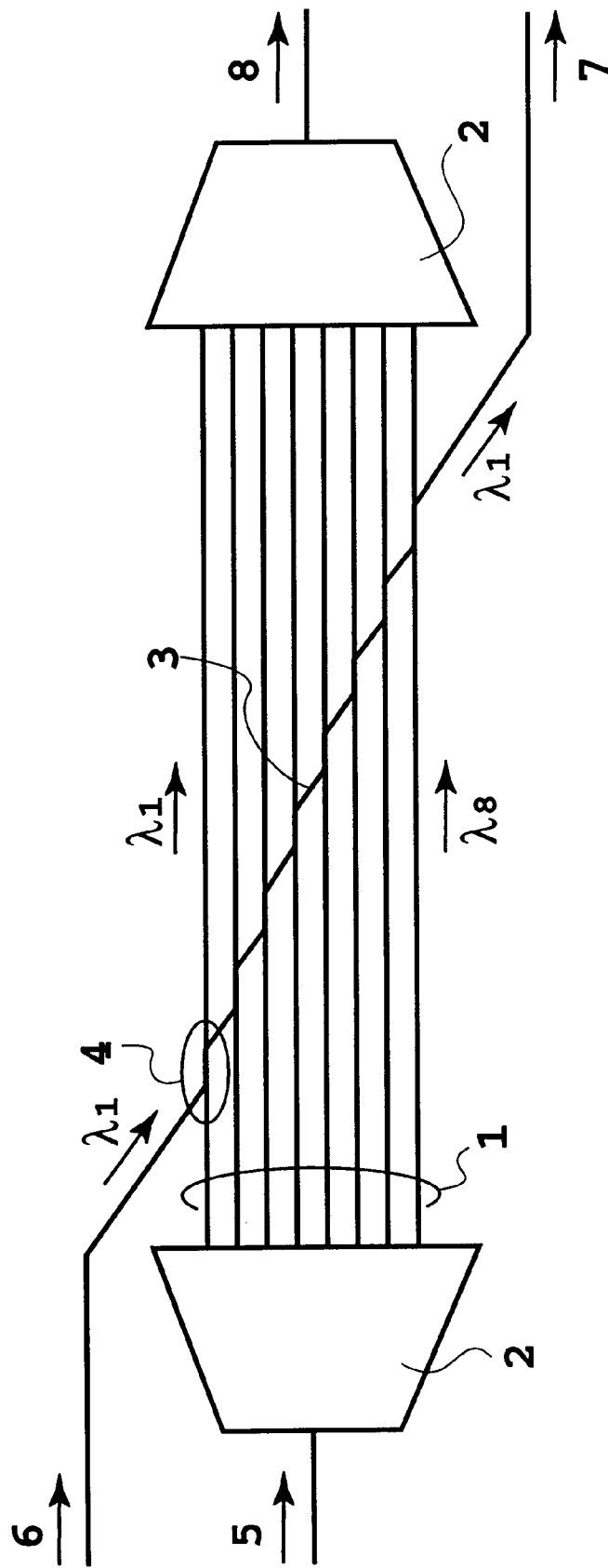
FIG. 11 is a diagram showing the structure of an optical ADM circuit according to the present invention using a gap arrangement 2×2 directional coupler type switch as a unit switch.

An optical ADM circuit using the matrix switch as shown in FIG. 11 is also devised. In FIG. 11, numeral 1 indicates a plurality of lower cores, 2 a pair of AWG, 3 an upper polymer core, 4 stacked thermo-optic switches, 5 a line input port, 6 an adding port, 7 a dropping port, 8 a line output port. In this circuit, de-multiplexed WDM signals propagate in the lower cores 1. By driving one of the switches 4, a corresponding wavelength signal is taken out to the dropping port 7 and new signal of the same wavelength input from adding port 6 is multiplexed and outputs to the line output port 8.

An optical ADM circuit using the gap arrangement 2×2 DC type switch as a unit switch was fabricated. As shown in FIG. 11, two units of 8-channel silica glass-based AWG were connected with eight silica glass-based non-branching non-crossing waveguides in a lower layer. Gap arrangement DC type switches were formed where a thermosetting silicone-based upper core crosses with the silica glass-based waveguide in the lower layer as viewed from a direction perpendicular to the substrate. Except that thermosetting silicone resin was used as polymer waveguide material, respective core sizes, core spacing, and relative refractive index difference of the upper and lower cores, and relative refractive index difference between the upper and lower core clads and the like were the same as those in embodiments 6. Each of the eight unit switches corresponds to one of eight wavelengths. The switch part was designed to be bar state when not heated and cross state when heated. It was confirmed that any signal with selected wavelength was branched from the WDM signal to the dropping port and the same wavelength signal input from the adding port was mixed with the WDM signal and outputted to the line output port. Circuit characteristics at this time are shown in Table 9.

TABLE 9

Characteristics of 8-wave multiplexing stacked optical ADM circuit

| | | | |
|---|---|---|---|
| Power consumption | Bar operation SW heating power | 3 | mW |
| | Cross operation SW heating power | 30 | mW |
| | ADM total power consumption | 51 | mW |
| Insertion loss | Line input to line output (other than selected wavelength signal) | 6 | dB |
| | Add port to line output (selected wavelength signal) | 5 to 11 | dB |
| | Line input to drop port (selected wavelength signal) | 5 to 11 | dB |

In above embodiment 7 and 8, a gap arrangement DC type switch is used, however, it is possible to construct the same matrix switch by using, for example, a digital type switch having a stacked X structure.

As described above, an attempt to use different materials in the upper and lower cores not only improves a specific characteristics such as low power consumption, but also make it possible to provide optical waveguides with different functions, and to use suitable materials for each function. Such a function sharing concept is also very effective for cost reduction including compact devices and improvement in yield, even in an estimate by a simple calculation, the device size and defect rate can be reduced to about a half. Optical modulation, WDM, optical amplification and the like can be functions of respective layers of the optical waveguides, in addition to the optical switch function and passive optical waveguide function described in detail in the present invention.

As described above, by using the stacked type switch according to the present invention, utilization of ideal temperature gradient and selection of optimum optical waveguide materials are possible, thereby enabling low power operation which could not be achieved with the prior art. Further, since, due to the structure of disposition in the thickness direction, the switch itself can be made compact, is easy for upscaling and upgrading to large-scale switches such as optical cross-connect or optical ADM, and its improved performance over the prior art optical switch can be provided in all areas requiring optical path switching, thus the present invention can be extensively utilized as an indispensable part in future lightwave networks and optical LAN.

The present invention has been described in detail with respect to preferred embodiments, and it will now be apparent from the foregoing to those skilled in the art that changes and modification may be made without departing from the invention in its broader aspect, and it is the invention, therefore, in the apparent claims to cover all such changes and modifications as fall within the true spirit on the invention.

What is claimed is:

1. A stacked thermo-optic switch, comprising:
   a clad;
   a substrate;
   a plurality of cores extending in a direction perpendicular to the substrate, one of the cores coupling to another one of the cores:
      via at least one contact surface of the respective cores, or
      via a gap layer of the clad, the gap layer being provided between the cores, having a predetermined thickness,
   wherein one of the cores overlaps another one of the cores in a predetermined area to switch an optical path, the optical path being switched by inducing a thermo-optic refractive index change in the vicinity of the predetermined area; and
   a heater heating the cores and lying above a vicinity of the predetermined area, wherein at least a portion of the clad is situated between the heater and the cores.

2. The stacked thermo-optic switch of claim 1, wherein one of the cores directly couples to at least another one of the cores via the respective contact surfaces, and
   wherein the heater is positioned at a surface of the clad layer which is opposite to the substrate.

3. The stacked thermo-optic switch of claim 1,
   wherein each of the cores has a part for photocoupling the respective cores with each other via the gap layer, and
   wherein the heater is positioned at a surface of the clad layer which is opposite to the substrate.

4. The stacked thermo-optic switch of claim 1, wherein one of the cores has a first refractive index, and another one of the cores has a second refractive index, the first refractive index being different from the second refractive index.

5. The stacked thermo-optic switch of claim 2, wherein one of the cores has a first refractive index, and another one of the cores has a second refractive index, the first refractive index being different from the second refractive index.

6. The stacked thermo-optic switch of claim 3, wherein one of the cores has a first refractive index, and another one of the cores has a second refractive index, the first refractive index being different from the second refractive index.

7. The stacked thermo-optic switch of claim 1, wherein one of the cores has a first thermo-optic coefficient, and another one of the cores has a second thermo-optic coefficient, the first thermo-optic coefficient being different from the second thermo-optic coefficient.

8. The stacked thermo-optic switch of claim 2, wherein one of the cores has a first thermo-optic coefficient, and another one of the cores has a second thermo-optic coefficient, the first thermo-optic coefficient being different from the second thermo-optic coefficient.

9. The stacked thermo-optic switch of claim 3, wherein one of the cores has a first thermo-optic coefficient, and another one of the cores has a second thermo-optic coefficient, the first thermo-optic coefficient being different from the second thermo-optic coefficient.

10. The stacked thermo-optic switch of claim 4, wherein one of the cores has a first thermo-optic coefficient, and another one of the cores has a second thermo-optic coefficient, the first thermo-optic coefficient being different from the second thermo-optic coefficient.

11. The stacked thermo-optic switch of claim 5, wherein one of the cores has a first thermo-optic coefficient, and another one of the cores has a second thermo-optic coefficient, the first thermo-optic coefficient being different from the second thermo-optic coefficient.

12. The stacked thermo-optic switch of claim 6, wherein one of the cores has a first thermo-optic coefficient, and another one of the cores has a second thermo-optic coefficient, the first thermo-optic coefficient being different from the second thermo-optic coefficient.

13. A switch matrix, comprising:
   a plurality of stacked thermo-optic switches, each including:
      a clad,
      a substrate,
      a plurality of cores extending in a direction perpendicular to the substrate, one of the cores coupling to another one of the cores:
         via at least one contact surface of the respective cores, or via a gap layer of the clad, the gap layer being provided between the cores, having a predetermined thickness, wherein the cores include lower cores and at least one upper core, the lower and upper cores overlapping with each other in a predetermined area to switch an optical path, the optical path being switched by inducing a thermo-optic refractive index change in the vicinity of the predetermined area, and a heater heating the cores and lying above a vicinity of the predetermined area, wherein at least a portion of the clad is situated between the heater and the cores, wherein the lower cores include a first number of glass-based optical waveguides not crossing each other, and the at least one upper core includes a second number of polymer-based optical waveguides, and wherein the stacked thermo-optic switches are constructed at a part positioned substantially at the predetermined area.

14. A switch matrix unit, comprising:

a plurality of stacked thermo-optic switches, each including:
  a clad,
  a substrate,
  a plurality of cores extending in a direction perpendicular to the substrate, one of the cores coupling to another one of the cores:
    via at least one contact surface of the respective cores, or
    via a gap layer of the clad, the gap layer being provided between the cores, having a predetermined thickness,
    wherein the cores include lower cores and at least one upper core, the lower and upper cores overlapping with each other in a predetermined area to switch an optical path, the optical path being switched by inducing a thermo-optic refractive index change in the vicinity of the predetermined area, and a heater heating the cores and lying above a vicinity of the predetermined area, wherein at least a portion of the clad is situated between the heater and the cores, wherein the lower cores include a first number of glass-based optical waveguides crossing each other, and the at least one upper core includes a second number of polymer-based optical waveguides, and wherein the stacked thermo-optic switches are constructed at a part positioned substantially at the predetermined area.

15. A switch matrix, comprising:

at least one stacked thermo-optic switch including:
  a clad,
  a substrate,
  a plurality of cores extending in a direction perpendicular to the substrate, one of the cores coupling to another one of the cores:
    via at least one contact surface of the respective cores, or
    via a gap layer of the clad, the gap layer being provided between the cores, having a predetermined thickness,
    wherein the cores include at least one lower glass core and at least one upper polymer core, the lower and upper cores overlapping with each other in a predetermined area to switch an optical path, the optical path being switched by inducing a thermo-optic refractive index change in the vicinity of the predetermined area, and
    a heater heating the cores and lying above a vicinity of the predetermined area, wherein at least a portion of the clad is situated between the heater and the cores, wherein the at least one lower core includes a plurality of glass-based reticulate crossed optical waveguides which form a lower-core crossing, and wherein the at least one upper polymer core connects a first upper core of a first further stacked thermo-optic switch situated at one arm of the lower-core crossing to a second upper core of a second further stacked thermo-optic switch situated at another arm of the lower-core crossing.

16. An optical add-drop multiplexer, comprising:

a plurality of switch matrix unit including:
  a stacked thermo-optic switches each including:
    a clad,
    a substrate,
    a plurality of cores extending in a direction perpendicular to the substrate, one of the cores coupling to another one of the cores:
      via at least one contact surface of the respective cores, or
      via a gap layer of the clad, the gap layer being provided between the cores, having a predetermined thickness,
      wherein the cores include lower cores and at least one upper core, the lower and upper cores overlapping with each other in a predetermined area to switch an optical path, the optical path being switched by inducing a thermo-optic refractive index change in the vicinity of the predetermined area, and a heater heating the cores and lying above a vicinity of the predetermined area, wherein at least a portion of the clad is situated between the heater and the cores;

a wavelength division multiplexer; and a wavelength division de-multiplexer connected to the wavelength division multiplexer via the switch matrix unit, wherein the lower cores include a first number of glass-based optical waveguides not crossing each other, and the at least one upper core includes a second number of polymer-based optical waveguides, and wherein the stacked thermo-optic switches are constructed at a part substantially at the predetermined area.

17. An optical add-drop multiplexer, comprising:

a switch matrix including:
  at least one stacked thermo-optic switch, including:
    a clad,
    a substrate,
    a plurality of cores extending in a direction perpendicular to the substrate, one of the cores coupling to another one of the cores:
      via at least one contact surface of the respective cores, or via a gap layer of the clad, the gap layer being provided between the cores, having a predetermined thickness, wherein the cores include at least one lower glass core and at least one upper polymer core, the lower and upper cores overlapping with each other in a predetermined area to switch an optical path, the optical path being switched by inducing a thermo-optic refractive index change in the vicinity of the predetermined area, and a heater heating the cores and lying above a vicinity of the predetermined area, wherein at least a portion of the clad is situated between the heater and the cores;

a wavelength division multiplexer; and a wavelength division de-multiplexer connected to the wavelength division multiplexer via the switch matrix, wherein the at least one lower core includes a plurality of glass-based reticulate crossed optical waveguides which form a lower-core crossing, and wherein the at least one upper polymer core connects a first upper core of a first further stacked thermo-optic switch situated at one arm of the lower-core crossing to a second upper core of a second further stacked thermo-optic switch situated at another arm of the lower-core crossing.

* * * * *